United States Patent [19]
Crane et al.

[11] Patent Number: 5,359,486
[45] Date of Patent: Oct. 25, 1994

[54] METHOD AND CIRCUIT FOR SYNCHRONIZATION OF RELAY OPERATION

[75] Inventors: Burke J. Crane, Lombard, Ill.; Garth S. Jones, Virginia Beach, Va.

[73] Assignee: Molex Incorporated, Lisle, Ill.

[21] Appl. No.: 35,850

[22] Filed: Mar. 23, 1993

[51] Int. Cl.⁵ ............................................. H05B 1/02
[52] U.S. Cl. ...................................... 361/3; 361/187; 361/160; 361/7; 361/5
[58] Field of Search ............... 361/160, 185, 179, 195, 361/187, 3, 7, 1-5, 174, 37, 92-97; 323/235, 236, 319; 219/519, 494, 509, 518, 493, 483-486, 492; 340/628, 626, 644

[56] References Cited
U.S. PATENT DOCUMENTS

4,897,755  1/1990  Polster et al. .................... 361/2
4,922,363  5/1990  Long et al. ........................ 361/3
5,008,516  4/1991  Holling ............................ 219/519
5,055,962  10/1991 Peterson et al. ................. 361/187
5,064,998  11/1991 Hollings .......................... 219/519

Primary Examiner—Howard L. Williams
Assistant Examiner—Aditya Krishnan
Attorney, Agent, or Firm—Stephen Z. Weiss

[57] ABSTRACT

A control circuit synchronizes operation of a latching relay to extend contact life. The relay is switched using an H-bridge drive circuit. The synchronization is done using a two-step delay. The first delay is provided by a phase shifter, which delays the timing signals used by a logic controller relative to a zero crossing. The second delay is provided by an adjustable timer circuit including a potentiometer. The two delays are used so that the latching relay is tripped at a selectable time coinciding with the second zero crossing after a switching command is received.

19 Claims, 5 Drawing Sheets

METHOD AND CIRCUIT FOR SYNCHRONIZATION OF RELAY OPERATION

FIELD OF THE INVENTION

This invention relates to control of a latching relay and, more particularly, to synchronization of relay contact switching.

BACKGROUND OF THE INVENTION

In providing electrical circuits to a facility, such as a home, one or more branch circuits are wired to distribute electrical power to load devices, such as light fixtures or outlet receptacles. Typically, the receptacle or fixture is hardwired directly to the branch circuit, with power to the device being turned on or off at the device itself. For example, a light fixture might include a pull cord for actuating a switch, while a small appliance might include a power switch.

With recent technological developments it is both possible and advantageous to provide automated control of load devices to provide, for example, remote or timed switching. One such system directs all communication functions into a master system controller. This gives a homeowner flexible communication and power control from anywhere in the home there is a control panel or switch, or even anywhere there is a telephone, such as the car or office. An intelligent outlet receptacle or fixture block allows individual appliances or fixtures to be separately and automatically controlled as necessary or desired. To do so, some means must be provided for controlling switching of power to the load device. To be practical, the switching must be done inexpensively and accurately. A latching relay has been found to be readily adaptable to such an application. A latching relay is latched when connected to a positive polarity voltage source and unlatched when connected to a negative polarity voltage source.

A latching relay includes a relay coil and an electrical contact switched by the relay coil. The relay contact is connected between an AC power source and the load device. Opening and closing of the contact can produce arcing if the transition occurs at a non-zero point on the AC input waveform. This requires that a larger capacity relay be used, increasing expenses and size, to withstand these conditions. Therefore, a desire exists to avoid arcing so that a smaller relay can be used. A known procedure for minimizing arcing is to synchronize the switching of the contact to the AC line input. Particularly, the relay is controlled to lead energization of the relay so that the expected contact switching time occurs at or close to a zero crossing of the AC input.

Without any synchronization the switching occurs randomly. Thus, arcing may or may not occur. While this situation is undesirable, a worse situation exists if a synchronization circuit is not properly timed. As a result, arcing will always occur. Therefore, it is desirable that a synchronization scheme be used which provides adequate time and adjustability to ensure that switching occurs at or near a zero crossing.

The present invention is intended to overcome one or more of the problems discussed above in a novel and simple manner.

SUMMARY OF THE INVENTION

In accordance with the invention, there is provided a relay control circuit using synchronization of relay contact switching.

Broadly, there is disclosed herein a control circuit controlling switching of a relay, the relay having a relay coil and an electrical contact switched by the relay coil. The contact, in use, is connected between an AC power source and a load. The control circuit synchronizes contact opening or closing with a zero crossing of AC power. The control circuit includes command means for developing a command signal to close or open the contact to selectively connect or disconnect the load to the power source. A controllable switch circuit is connected to the relay coil for controlling energization of the relay coil. A switch control circuit is electrically connected to the command means and the switch circuit for controlling the switch circuit to switch the relay to open or close the contact in response to a command signal from the command means, the switch control circuit including time delay means for delaying switching of the relay coil a select duration so that the contact changes state at or near a second zero crossing of AC power subsequent to receipt of a command signal to close or open the contact.

It is a feature of the invention that the switch control circuit includes a logic control circuit developing a switch command in response to the command signal and a drive circuit connected between the logic control circuit and the switch circuit for driving the switch circuit in response to a switch command.

It is another feature of the invention that the time delay means comprises a first delay circuit for delaying development of the switch command a first duration subsequent to receipt of the command signal and a second delay circuit operatively associated with the drive circuit for delaying driving of the switch circuit a second duration subsequent to receipt of a switch command.

It is another feature of the invention that the first delay circuit comprises a synchronization circuit developing a synchronization clock signal phase displaced relative to AC power.

It is another feature of the invention that the second delay circuit comprises a multivibrator circuit triggered by the switch command and developing a pulse of the second duration in length.

It is a further feature of the invention that the second delay circuit comprises a variable resistor connected to the multivibrator circuit for selecting length of the second duration to match switching time of the relay.

It is a further feature of the invention that the second delay circuit comprises first and second variable resistors, and means for operatively connecting one of the variable resistors to the multivibrator circuit according to whether the switched command is to open or close the contact, the variable resistors selecting length of the second duration to match switching time for respectively opening or closing of the relay contact.

There is disclosed in accordance with another aspect of the invention a control circuit controlling switching of a latching relay, the relay having a relay coil and an electrical contact switched by the relay coil. The contact, in use, is connected between an AC power source and a load. The control circuit synchronizes contact opening or closing with a zero crossing of AC power. The control circuit includes command means for developing a command signal to close or open the contact to selectively connect or disconnect the load to the power source. A controllable switch circuit is connected to the relay coil for controlling energization of the relay coil. A logic control circuit develops a switch command in response to the command signal. A drive circuit is connected between the logic control circuit and the switch circuit for driving the switch circuit in response to a switch command. A time delay means delays switching of the relay coil a select duration so that the contact changes state at or near a zero crossing of AC power subsequent to receipt of a command signal to close or open the contact. The time delay means comprises a first delay circuit for delaying development of the switch command a first duration subsequent to receipt of the command signal and a second delay circuit operatively associated with the drive circuit for delaying driving of the switch command a second duration subsequent to receipt of a switch command.

There is disclosed in accordance with a further aspect of the invention a method for controlling switching of a latching relay, the relay having a relay coil and an electrical contact switched by the relay coil. The contact, in use, is connected between an AC power source and a load. The method synchronizes contact opening or closing with a zero crossing of AC power. The method includes the steps of receiving an enable command to close or open the contact to selectively connect or disconnect the load to the power source, developing a switch command in response to the enable command, the switch command being delayed a first time duration relative to the enable command, receiving the switch command and developing a relay drive signal, the drive signal being delayed a second time duration relative to the switch command, and controlling a switch circuit connected to the relay coil to control energization of the relay coil in response to the drive signal so that the contact changes state at or near a zero crossing of AC power subsequent to receipt of a command signal to close or open the contact.

It is a feature of the invention that the controlling step comprises commanding the switch circuit in response to the switch command but inhibiting switching of the switch circuit until completion of the second duration.

It is a further feature of the invention that the controlling step comprises controlling the switch circuit for a third time duration to provide a control pulse to operate the relay.

More particularly, the control relates to synchronizing operation of a latching relay to extend contact life. The relay is switched using an H-bridge drive circuit. The synchronization is done using a two-step delay. The first delay is provided by a phase shifter, which delays the timing signals used by a logic controller relative to a zero crossing. The second delay is provided by an adjustable timer circuit including a potentiometer. The two delays are used so that the latching relay is tripped at a selectable time coinciding with the second zero crossing after a switching command is received.

Further features and advantages of the invention will be readily apparent from the specification and from the drawing.

DETAILED DESCRIPTION OF THE INVENTION

Figure 1:
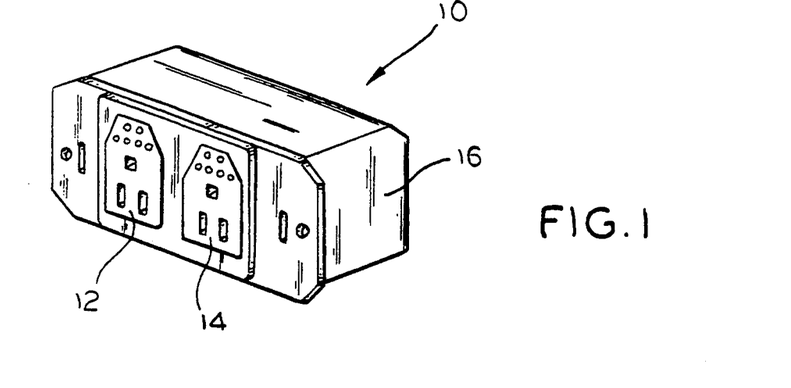
FIG. 1 is a perspective view of a switched power receptacle according to the invention.

With reference to FIG. 1, a switched power receptacle 10 in accordance with the invention is illustrated. The switched power receptacle 10 includes a first outlet receptacle 12 and a second outlet receptacle 14, each included in a housing 16. Each outlet receptacle 12 and 14 is adapted to receive a conventional three-prong plug for selectively providing electrical power thereto. The illustrated outlet receptacles 12 and 14 include additional receptacle structure for data communications which are not relevant to the claimed invention and therefore are not described in detail herein.

Figure 2A:
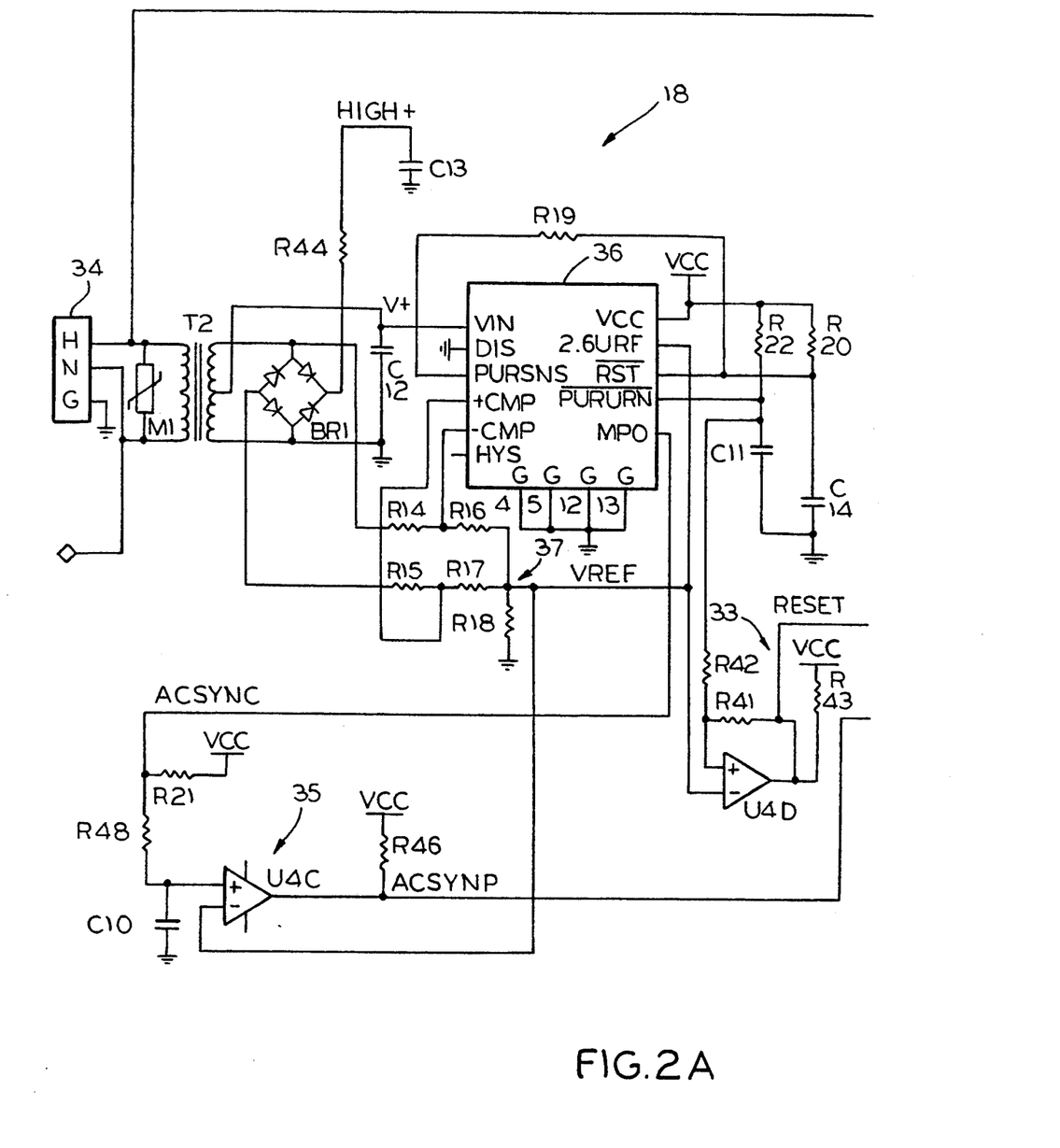
FIGS. 2A–2C are a schematic diagram illustrating a circuit for the receptacle of FIG. 1.
Figure 2B:
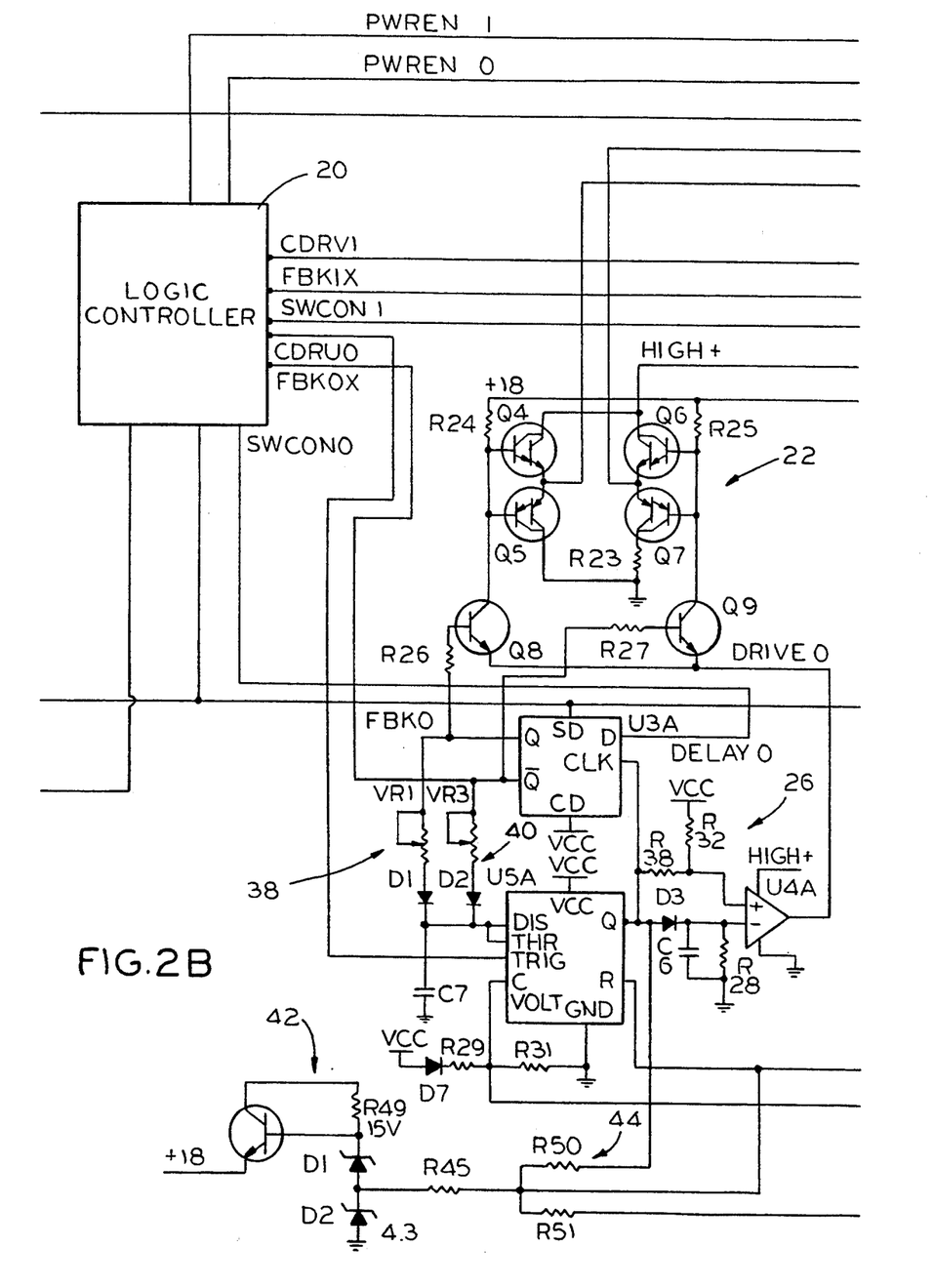
Figure 2C:
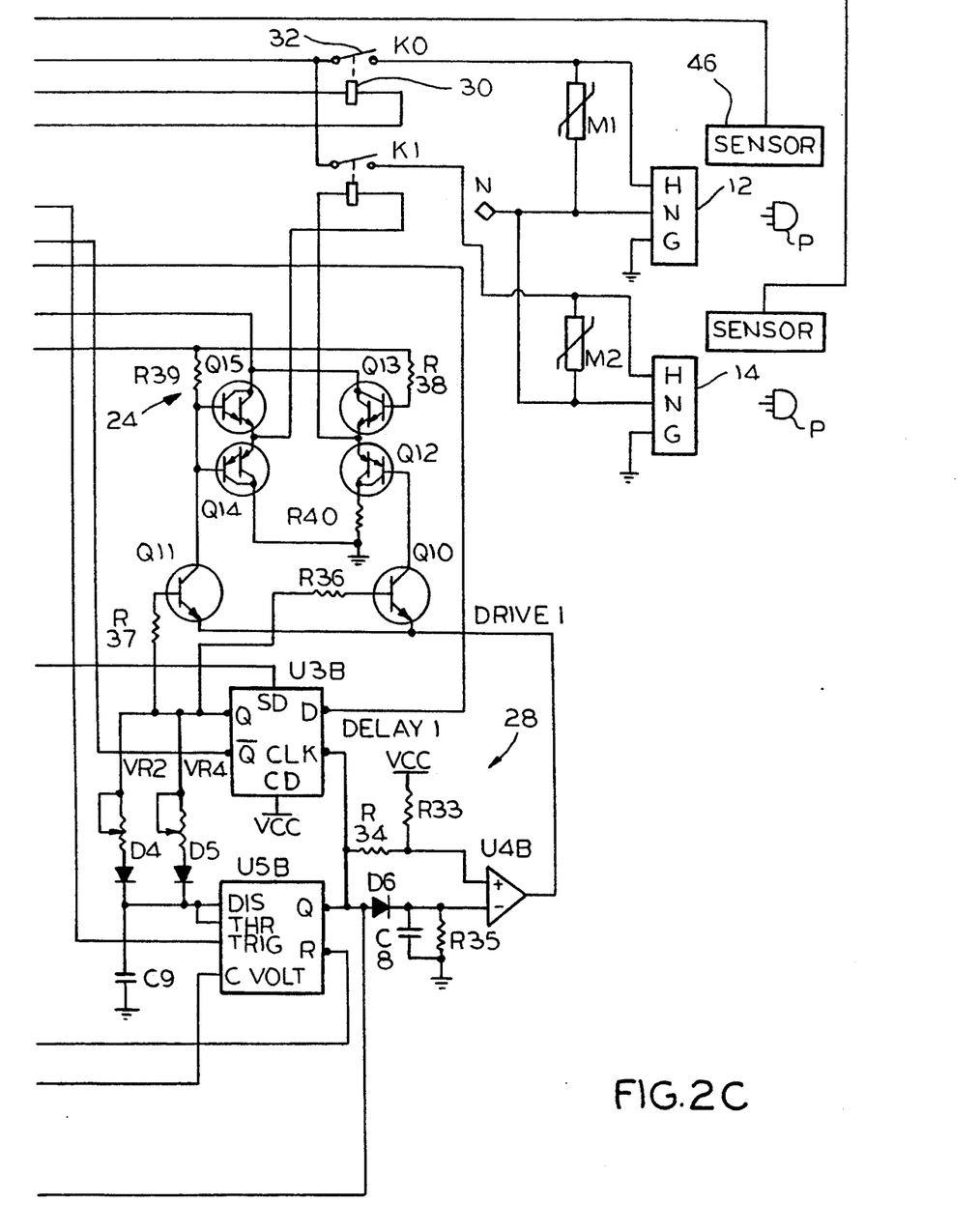

With reference to FIGS. 2A–2C, a control circuit 17 for the switched power receptacle 10 is illustrated schematically. Generally, the control circuit 17 includes a power supply circuit 18, a first latching relay K0 for controlling the first outlet receptacle 12, and a second latching relay K1 for controlling the second outlet receptacle 14. A first switch circuit 22 selectively connects power from the power source 18 to the first latching relay K0. A second switch circuit 24 selectively connects power from the power source 18 to the second latching relay K1. The switch circuits 22 and 24 are driven by respective drive circuits 26 and 28, as commanded by a logic controller 20.

Each of the outlet receptacles 12 and 14 is identical in construction, as are the associated latching relays K0 and K1, switch circuits 22 and 24 and drive circuits 26 and 28. For simplicity herein, only the components associated with the first outlet receptacle 12 are described in detail, it being understood that the corresponding components for the second outlet receptacle 14 operate similarly.

The latching relay K0 has a relay coil 30 and an electrical contact 32 switched by the relay coil 30. The relay coil 30 is latched when connected to a positive polarity voltage source and unlatched when connected to a negative polarity voltage source.

In accordance with the invention, the latching relay K0 is permanently magnetized so that upon actuation by a relatively high current of positive polarity an included plunger is magnetically retained in an actuated position to close the contact 32. When reverse polarity power is connected to the relay coil 30, the magnetic field is reduced so that a spring force returns the plunger to an unlatched position opening the contact 32. The latching relay K0 may be of any conventional construction.

The power supply circuit 18 includes a terminal block 34 connected to a conventional 120 volt AC power source and having terminals labeled "H" for hot, "N" for neutral and "G" for ground. The electrical contact 32 is connected between the hot terminal H and the hot terminal of the outlet receptacle 12 for selectively applying power to the same. The neutral and ground terminals of the outlet receptacle 12 are connected to the corresponding terminals of the input terminal block 34.

The power supply circuit 18 is connected to the 120 volt power source via the terminal block 34. A transformer T2 reduces input voltage which is rectified by a full wave bridge rectifier BR1. The rectifier BR1 is connected via a resistor R44 to a storage capacitor C13 to develop unregulated DC power, labeled "HIGH+" for driving the latching relays K0 and K1 A voltage regulator circuit 36 is also connected to the bridge rectifier BR1 and a secondary tap on the transformer T1 for developing regulated voltage, labeled VCC, for powering various components, including the logic controller 20. The voltage regulator 36 may comprise, for example, an MC34160 microprocessor voltage regulator and supervisory circuit as manufactured by Motorola Inc.

The voltage regulator 36 includes an extra comparator circuit having inputs labeled +CMP and −CMP and an output labeled CMP0. The rectifier BR1 is also connected to a resistor bridge 37 consisting of resistors R14, R15, R16, R17 and R18 connected to act as a balanced voltage divider. The bridge 37 is connected to the inputs of the comparator of the voltage regulator 36. The input of the comparator is a square wave signal in synchronization with the AC signal at the secondary of the transformer T2. The comparator of the voltage regulator 36 provides hard limiting and its output is a square wave synchronization signal on a line labeled ACSYNC which is input to a phase shifter circuit 35.

The phase shifter circuit 35 includes a pullup resistor R21 and an integrator consisting of a resistor R48 and capacitor C10 connected to the non-inverted input of a comparator U4C. The inverted input of the comparator U4C is connected to a voltage reference from the bridge circuit 37. The output of the comparator U4C is a square wave output signal on a line labeled ACSYNP at the same frequency as the line voltage and phase shifted ninety degrees. This signal is input to the logic controller 20 and is used as an AC synchronization reference by the logic controller 20 for driving counters and time outputting of on and off control pulses.

The integrator consisting of the resistor R48 and capacitor C10 also operates as a low pass filter to filter glitches or transients from the secondary of the transformer T2. The use of a low pass filter after hard limiting renders the synchronization signal more immune to transients and reduces probability of noise interference. The use of filtering after hard limiting requires that the filter circuit only operate with five volt pulses, being the output from the comparator of the voltage regulator 36. Thus, the hard limiting clips the transients.

A reset buffer circuit 33 includes a comparator U4D connected to the voltage regulator 36 for developing a reset signal on a line labeled RESET. The RESET line is connected to the logic controller 20 for providing a power on reset for the same.

The switch circuit 22 comprises an H-bridge circuit including transistors Q4, Q5, Q6 and Q7 connected in a bridge configuration. The H-bridge switch circuit 22 controls polarity of the power labeled HIGH+ connected to the latching relay K0. Particularly, the transistors Q5 and Q6 are simultaneously switched to connect positive polarity to the relay coil 30 for latching. The transistors Q4 and Q7 are simultaneously switched to connect negative polarity power to the relay coil 30. As such, the relay coil 30 is powered from a low voltage drive using energy stored in the storage capacitor C13.

The relay K0, being of the remnant-latching type, requires a well-defined pulse to operate. The pulse is developed by the drive circuit 26, as discussed below. To avoid over-magnetization during unlatching, a current limit resistor R23 is connected between the transistor Q7 and ground. The resistor R23 ensures that the negative amperes turns will create a zero flux density to reverse the latch. Particularly, the current limit resistor R23 prevents an unwanted negative flux density in the relay coil 30.

The drive circuit 26 is controlled by commands received from the logic controller 20. The logic controller 20 may be an integrated circuit including hardwired gates and latches to perform the described functions or may be a conventional microcontroller programmed for developing logic signals as necessary for the particular application. The logic controller 20 communications with the drive circuit 26 via three lines as follows: a control drive line, labeled "CDRV0" a switch control line labeled "SWCON0" and a feedback line labeled "FBKOX".

The drive circuit 26 includes a flip-flop U3A, a comparator U4A and delay circuit 27 including a monostable multivibrator U5A and associated components discussed below.

The flip-flop U3A may be a type 74HC74 circuit chip. The multivibrator U5A may be a type TLC556C circuit chip having a trigger input connected to the CDRV0 line. Its output Q is connected via a line labeled "DELAY0" to the clock input of the flip-flop U3A. The data output for the flip-flop U3A is connected to the SWCON0 line from the logic controller 20. The SD terminal is connected to the reset line RESET. The non-inverted output is connected to a line labeled FBK0 which drives a transistor Q8 for controlling the H-bridge circuit 22 for latching of the relay K0. The inverted output is connected to the line FBKOX and to a transistor Q9 for controlling the H-bridge switch circuit 22 to control unlatching of the relay K0. The inverted output is also used to provide indirect feedback of relay status to the logic controller 20, as described below.

The delay circuit multivibrator U5A, also referred to as a one shot or single shot, develops a pulse of a duration determined by an RC input to terminals labeled DIS and THR. These terminals are connected between an operate delay circuit 38 including a potentiometer VR1 to the non-inverted output of the flip-flop U3A and via a release delay circuit 40 to the inverted output of the flip-flop U3A, and to a capacitor C7. The potentiometers VR1 and VR3 are used to selectively adjust the duration of the one shot pulse signal from the multivibrator U5A. Particularly, the delay can be selected so that switching of the latching relay K0 coincides with a zero crossing of input power. In the latching mode, i.e., when the flip-flop U3A is set, its non-inverted output goes high so that the pulse duration is controlled by the operate delay circuit 38. In the unlatching mode, i.e., when the flip-flop U3A is reset, its inverted output goes high so that the pulse duration is selected by the release delay circuit 40.

The output of the multivibrator U5A is also connected via a diode D3 to an inverted input of the comparator U4A. Also connected to the inverted input are a parallel combination of a capacitor C6 and resistor R28. The non-inverted input of the comparator U4A is connected to a junction between resistors R32 and R30 which are connected in series between the VCC node and the output of the multivibrator U5A. The comparator U4A may comprise, for example, an LM339 type circuit chip. The output of the comparator U4A is connected to the emitter of each of the transistors Q8 and Q9, the collectors of which are connected to the respective H-bridge transistors Q4 and Q5, and Q6 and Q7.

The drive circuit 26 uses indirect feedback of relay status. Therefore, it is necessary to ensure that the feedback accurately represents the status of the relay K0. A voltage sensing circuit 42 operates in connection with an inhibit circuit 44 to inhibit pulsing of the latching relay coil 30 if the voltage is too low to ensure turn on. Otherwise, the status of the flip-flip U3A would be out of sync with the relay K0.

The sensing circuit 42 includes zener diodes ZD1 and ZD2 connected in series with a resistor R49 to the HIGH+ supply. The HIGH+ supply is also connected to the collector of a transistor Q16, the base of which is connected to the junction between the resistor R49 and the zener diode ZD1. The emitter of the transistor Q16 is connected to a node labeled 18+ connected to the H-bridge drive circuit 22. The inhibit circuit 44 includes a resistor R45 connected to the junction between the zener diodes ZD1 and ZD2 and the reset terminal of the multivibrator U5A. An additional resistor R50 is connected to the output of the multivibrator U5A.

In the illustrated embodiment of the invention, the latching relay 30 is controlled in response to command signals generated by the logic controller 20. These command signals may be generated in response to a command received from a remote device, such as a master system controller or a wall switch (not shown) connected to data inputs for the logic controller 20. In the illustrated embodiment of the invention, comprising an intelligent outlet receptacle, the command is received from a sensor 46 operatively associated with the outlet receptacle 12. Particularly, the sensor 46 comprises a plug presence sensor which senses presence or absence of a plug P being inserted in the outlet receptacle 12. Indeed, the sensor 46 may include a light source and light sensor having a beam broken by prongs of a plug P when inserted in the outlet receptacle 12. The sensor 46 provides feedback on a power enable line labeled PWREN0 to the logic controller 20. This signal comprises a command to latch the relay K0 when a plug is inserted in the outlet receptacle 12 or to unlatch the relay K0 when a plug is removed from the outlet receptacle 12.

Figure 3:
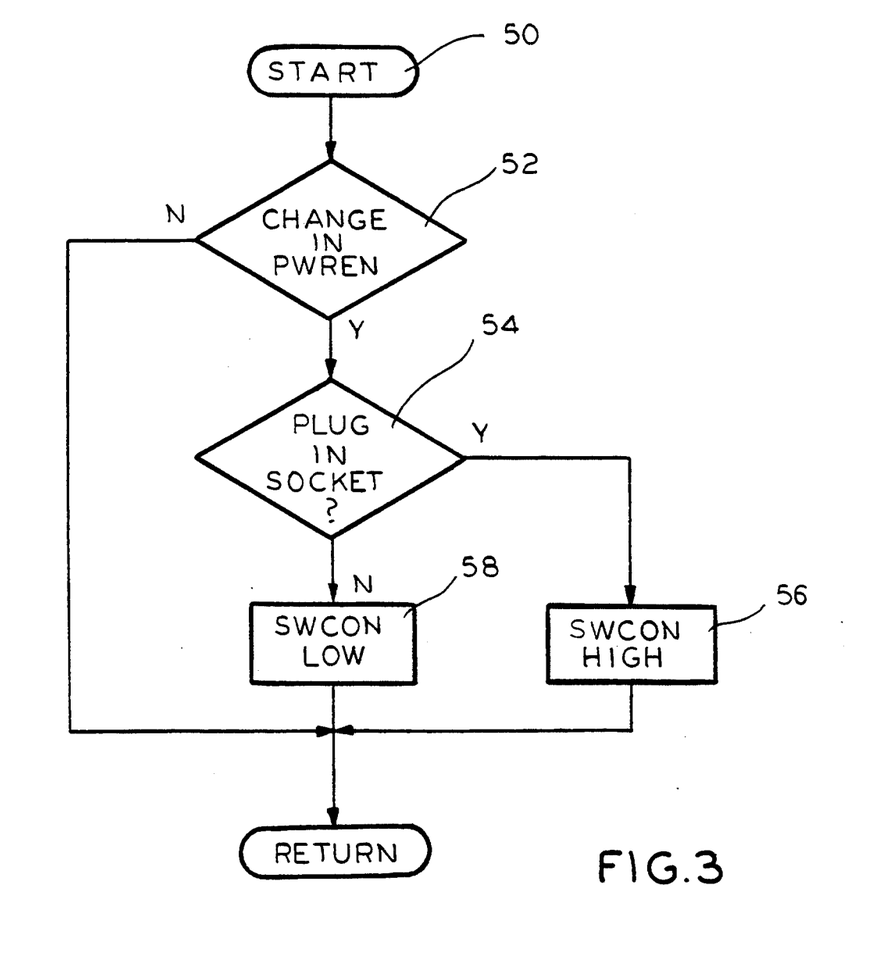
FIG. 3 is a flow diagram illustrating functional operation of the logic controller of FIG. 2B.

With reference to FIG. 3, a flow diagram illustrates the functional control provided by the logic controller 20 for controlling operation of the control circuit 18. The logic controller 22 may be configured for performing many different functions, such as providing remote control of the latching relay K0. The flow diagram illustrated in FIG. 3 is a portion of such functionality related specifically to automatic control for the outlet receptacle 12 in response to presence or absence of a plug.

The control starts at a node 50 and then a decision block 52 determines if there is a change in a power enable line PWREN0 to the logic controller 20. If not, then the routine ends. A change occurs when the plug P is inserted or is removed from the outlet receptacle 12, causing a change in state of the input from the sensor 46. When a change is sensed on the PWREN0 line, then a decision block 54 determines if the change represents a plug being in the outlet receptacle 12, i.e., the PWREN0 line going low. If so, then the switch control line SWCON0 is set high at a block 56 and the routine ends. If not, then a switch control line SWCON0 is set low at a block 58 and the routine ends.

When the switch control line SWCON0 goes high, then the switch control circuit 26 controls the H-bridge circuit 24 to generate a positive polarity pulse to the relay coil 30 to close the contact 32 to power the outlet receptacle 12. Conversely, when the switch control line SWCON0 goes low, the transition is sensed by the switch control circuit 26, causing the H-bridge circuit 24 to generate a negative polarity pulse to the relay coil 30 to open the contact 32 and disable the outlet receptacle 12.

Figure 4:
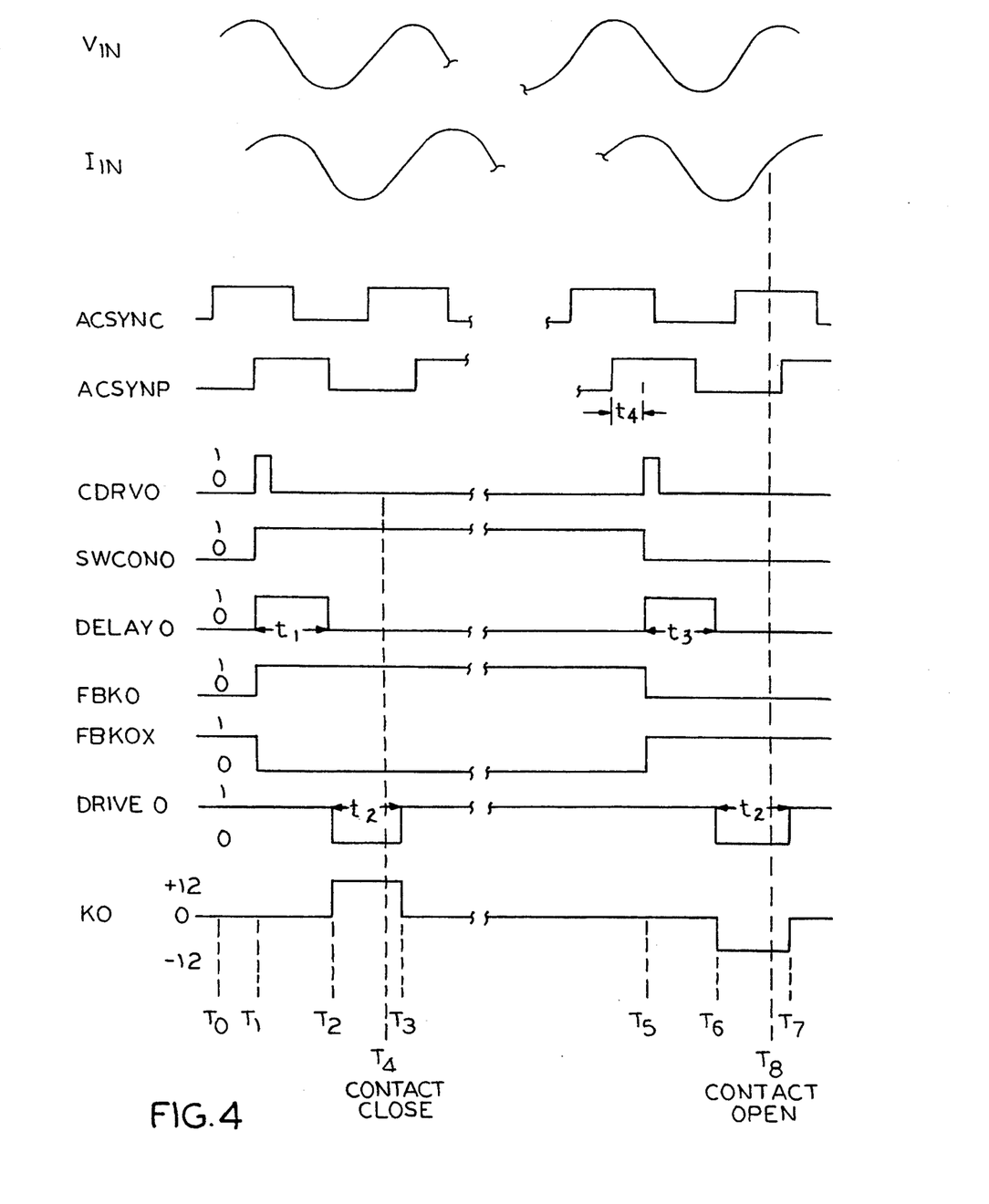
FIG. 4 is a timing diagram illustrating signals developed by various components of the schematic of FIGS. 2A–2C.

With reference to FIG. 4, a timing diagram illustrates signal levels associated with controlling of the latching relay K0. The timing diagram initially illustrates signal levels of the circuit at power up, with the latching relay K0 in the unlatched state, i.e., the contact 32 is open. The timing diagram illustrates the AC input voltage $V_{IN}$ at the secondary of the transformer T2 and logic signals on the lines ACSYNC, ACSYNP, CDRV0, SWCON0, DELAY0, FBK0, FBKOX, DRIVE0 and status of power applied to the relay K0. The timing diagram also illustrates a representation of AC input current $I_{IN}$. Although input current is not sensed, the current lags voltage by some amount dependent upon reactance of loads. In the illustrated timing diagram the input current is assumed to lag input voltage by some amount dependent upon reluctance of loads. In the illustrated timing diagram the input current is assumed to lag input voltage by approximately 70°, which is typical of phase delay of current flowing through large motor loads.

The voltage at the secondary of the transformer T2 is a sinusoidal signal as is conventional with AC power. As discussed above, the ACSYNC signal, as shown, is a square wave at the same frequency and phase of the transformer secondary output. The phase shifter circuit 35 develops a signal on the line ACSYNP phase shifted ninety degrees relative to the ACSYNC signal. This synchronization signal is used by the logic controller as the synchronization reference. As such, the phase shifter circuit 35 acts as a time delay circuit providing a time delay of a first duration, represented by the difference between the times $T_0$ and $T_1$ corresponding to the ninety degree phase shift. This first time delay is used in connection with synchronizing switching of the relay K0 to zero crossing of the AC input.

A signal for commanding the latching or unlatching of the relay K0 is generated from the logic controller 20. The logic controller 20 could be acting in accordance with any desired parameter for triggering relay switching, such as the power enable command PWREN0. Alternatively, the command could be generated in response to a user actuation of a push button or toggle switch, the command could be based on time of day, or any other parameter for which the logic controller 20 has been programmed.

The desired state of the relay is commanded by the logic state of the switch control line SWCON0. When the line is at a logic high level, then it is desired to latch the relay K0, while when the line is at a logic low, it is desired to unlatch the relay K0. The actual switching occurs when a pulse is transmitted from the controller 20 on the control drive output line CDRV0 at a time $T_1$. Indeed, the time $T_1$ is determined by the synchronization signal on the line ACSYNP, subsequent to receipt of a command signal from the sensor 46. As shown, this coincides with a leading edge of a high going signal on the switch control line SWCON0. The pulse on the CDRV0 line triggers the multivibrator U5A so that its output on the DELAY0 line goes high at the time $T_1$, ignoring normal circuit delays. The output of the multivibrator U5A clocks the flip-flop U3A so that the non-inverted output assumes the state of the data input, which is the signal on the line SWCON0, which is high.

Conversely, the inverted output on the FBK0X line goes low. Consequently, the latched transistor Q8 receives a command at its base so that the H-bridge circuit 22 should be controlled to latch the relay coil 30. However, the signal on the line DRIVE0 from the comparator U4A is high so that the transistors Q8 and Q9 are inhibited from operation.

The signal on the DELAY0 line remains high for a select duration $t_1$ from the time $T_1$ to a time $T_2$ determined by the select resistance of the potentiometer VR1 in conjunction with the capacitor C7. When the DELAY0 output goes low at the time $T_2$, the output of the comparator U4A, i.e., the signal on the DRIVE0 line goes low, to enable the transistors Q8 and Q9. The transistor Q8 connected to the FBK0 line is switched on, while the transistor Q9 connected to the FBK0X line remains off so that the H-bridge circuit connects positive polarity power to the latching relay coil 30. The output of the comparator U4A remains low for a time duration $t_2$ determined by the capacitor C6 and resistor R28 until a time $T_3$. The time duration $t_2$ is selected to be of sufficient duration so that the relay K0 will latch to close the contact 32 at a time $T_4$ slightly before the time $T_3$. Thereafter, the H-bridge circuit 22 is disabled and the relay K0 remains latched. Indirect feedback status of the relay is read by the logic controller 20 as the status of the FBK0X line, recognizing that a low logic signal represents the relay contact 32 being closed.

Any relay will include a characteristic turn on or turn off time representing the amount of time from applying or removing power to the coil until the contact respectively closes or opens. This characteristic varies from one relay to another. In the illustrated timing chart, this is represented by the time difference between the times $T_2$ and $T_4$. Advantageously, the time $T_2$ in connection with the relay switching time is selected to lead the zero crossing of AC input voltage. This is done by varying the time duration $t_1$ so that the time $T_4$ occurs at a zero crossing of the AC power signal from the transformer T2, as shown. Particularly, in accordance with the invention, the first time delay, provided by the phase shifter circuit 35 and the second time delay $t_1$ are selected so that the time $T_4$ occurs at the second zero crossing of the supply voltage after receipt of the command signal by the logic controller 20. To satisfy the variability of any particular latching relay K0, the potentiometer VR1 can be varied to shorten or lengthen the time duration $t_1$ and thus control the time $T_2$ to provide contact closure at the zero crossing.

Preferably, the closing of a relay contact occurs at or near a zero crossing of AC voltage. Opening of the relay contact preferably occurs at or near a zero crossing of AC current. As above, the time $T_2$ is selected so that the contact closes at or near a zero crossing of the input voltage $V_{IN}$. In accordance with the invention, a similar scheme is used for contact opening, except that the contact opening is further delayed a time corresponding to a select 70° phase difference between input voltage and current, as represented by the curves $V_{IN}$ and $I_{IN}$.

The relay contact 32 remains closed until commanded to unlatch the relay K0 at a time $T_5$ when the switch control line SWCON0 is changed to logic low and the control drive CDRV0 line is pulsed high. The time $T_5$ coincides with the synchronization signal on the line ACSYNP and delayed a time $t_4$ corresponding to the 70° phase difference between voltage and current. This delay may be implemented in the logic controller 20 or with a separate delay circuit (not shown). This results in the DELAY0 signal being pulsed for a time duration $t_3$ determined by the release delay selected by the potentiometer VR3 until a time $T_6$ at which the DRIVE0 output goes low, again for a time duration $t_2$, to provide a negative polarity pulse at the relay K0 until a time $T_7$. Again, the time $t_2$ is selected so that the relay K0 will unlatch to open the contact 32 at a time $T_8$ prior to the time $T_7$. The indirect feedback signal line FBK0X being logic high indicates that the contact 32 is in the open state.

As with the contact closure, the time delay $t_3$, along with the time delay from the phase shifter circuit 35, and along with the delay $t_4$ for the phase delay provides for the contact to open at a time $T_8$ corresponding with the second zero crossing of the anticipated input circuit after receipt of the command by the logic controller 20.

In the event that the DC power on the line HIGH+ is insufficient to switch the relay K0, as determined by the voltage sense circuit 42, then the inhibit circuit 44 resets the multivibrator U5A to prevent clocking of the flip-flop U3A or switching via the comparator U4A, so that the relay K0 remains in its current state. Thus, neither the relay state changes, nor does the state of the feedback from the flip-flop U3A, due to the inhibiting of the clocking signal. This feedback information can be used by the logic controller 20 to make additional attempts to change the relay state or go into an alarm or error mode, as necessary or desired.

The latching relay control circuit as described herein is for use in connection with controlling the latching relay K0 to control power to an outlet receptacle 12. An identical circuit could be used for controlling the latching relay for applying power to any electrical fixture, such as a light fixture. In such an instance, the outlet receptacle 12 is replaced with a terminal block for connection to such as fixture or other load device.

While the control circuit 26 and switch circuit 22 are illustrated schematically as electrical components, such functions could also be provided in a microprocessor which functions of the hardware elements performed by software in the microprocessor. Additionally, the flipflop U3A which serves as a memory element could be replaced with a non-volatile memory element, such as a latching relay, a battery backed up memory circuit or an EEROM memory circuit.

Thus, in accordance with the invention there is disclosed a relay drive circuit which synchronizes relay switching to a zero crossing of the AC input. This circuit minimizes arcing of relay contact and provides sufficient time delay to ensure proper synchronization.

We claim:

1. A control circuit controlling switching of a relay, said relay having a relay coil and an electrical contact switched by said relay coil, said contact, in use, being connected between an AC power source and a load, to synchronize contact opening or closure with a zero-crossing of AC power, comprising:
   command means for developing a command signal to close or open said contact to selectively connect or disconnect the load to the power source;
   a controllable switch circuit connected to said relay coil for controlling energization of said relay coil; and
   a switch control circuit electrically connected to said command means and said switch circuit for controlling said switch circuit to switch said relay coil to open or close said contact in response to a command signal from said command means, said switch control circuit including time delay means for delaying switching of said relay coil a select duration so that said contact changes state at or near a second zero crossing of AC power subsequent to receipt of a command signal to close or open said contact.

2. The control circuit of claim 1 wherein said switch control circuit includes a logic control circuit developing a switch command in response to said command signal and a drive circuit connected between said logic control circuit and said switch circuit for driving said switch circuit in response to a switch command.

3. The control circuit of claim 2 wherein said time delay means comprises a first delay circuit for delaying development of said switch command a first duration subsequent to receipt of said command signal and a second delay circuit operatively associated with said drive circuit for delaying driving of said switch circuit a second duration subsequent to receipt of a switch command.

4. The control circuit of claim 3 wherein said first delay circuit comprises a synchronization circuit developing a synchronization clock signal phase displaced relative to AC power.

5. The control circuit of claim 3 wherein said second delay circuit comprises a multivibrator circuit triggered by said switch command and developing a pulse of said second duration in length.

6. The control circuit of claim 5 wherein said second delay circuit comprises a variable resistor connected to said multivibrator circuit for selecting length of said second duration to match switching time of said relay.

7. The control circuit of claim 5 wherein said second delay circuit comprises first and second variable resistors, and means for operatively connecting one of said variable resistors to said multivibrator circuit according to whether said switch command is to open or close said contact, said variable resistors selecting length of said second duration to match switching time for respectively opening or closing of said relay contact.

8. A control circuit controlling switching of a latching relay, said relay having a relay coil and an electrical contact switched by said relay coil, said contact, in use, being connected between an AC power source and a load, to synchronize contact opening or closure with a zero-crossing of AC power, comprising:
command means for developing a command signal to close or open said contact to selectively connect or disconnect the load to the power source;
a controllable switch circuit connected to said relay coil for controlling energization of said relay coil;
a logic control circuit developing a switch command in response to said command signal;
a drive circuit connected between said logic control circuit and said switch circuit for driving said switch circuit in response to a switch command; and
time delay means for delaying switching of said relay coil a select duration so that said contact changes state at or near a zero crossing of AC power subsequent to receipt of a command signal to close or open said contact, comprising a first delay circuit for delaying development of said switch command a first duration subsequent to receipt of said command signal and a second delay circuit operatively associated with said drive circuit for delaying driving of said switch circuit a second duration subsequent to receipt of a switch command.

9. The control circuit of claim 8 wherein said first delay circuit comprises a synchronization circuit developing a synchronization clock signal phase displaced relative to AC power.

10. The control circuit of claim 8 wherein said second delay circuit comprises a multivibrator circuit triggered by said switch command and developing a pulse of said second duration in length.

11. The control circuit of claim 10 wherein said second delay circuit comprises a variable resistor connected to said multivibrator circuit for selecting length of said second duration to match switching time of said relay.

12. The control circuit of claim 10 wherein said second delay circuit comprises first and second variable resistors, and means for operatively connecting one of said variable resistors to said multivibrator circuit according to whether said switch command is to open or close said contact, said variable resistors selecting length of said second duration to match switching time for respectively opening or closing of said relay contact.

13. The control circuit of claim 8 wherein said first duration is of one select duration to close said contact and another select duration to open said contact.

14. The control circuit of claim 13 wherein said another select duration is longer than said one select duration so that said contact closes at or near a zero crossing of AC voltage and said contact opens at or near a zero crossing of AC current.

15. A method for controlling switching of a latching relay, said relay having a relay coil and an electrical contact switched by said relay coil, said contact, in use, being connected between an AC power source and a load, to synchronize contact opening or closure with a zero-crossing of AC power, comprising the steps of:
receiving an enable command to close or open said contact to selectively connect or disconnect the load to the power source;
developing a switch command in response to said enable command, said switch command being delayed a first time duration relative to said enable command;
receiving said switch command and developing a relay drive signal, said drive signal being delayed a second time duration relative to said switch command; and
controlling a switch circuit connected to said relay coil to control energization of said relay coil in response to said drive signal so that said contact changes state at or near a zero crossing of AC power subsequent to receipt of a command signal to close or open said contact.

16. The method of claim 15 wherein said controlling step comprises commanding said switch circuit in response to said switch command but inhibiting switching of said switch circuit until completion of said second duration.

17. The method of claim 15 wherein said controlling step further comprises controlling said switch circuit for a third time duration to provide a control pulse to operate said relay.

18. The control circuit of claim 4 wherein said synchronization circuit comprises a rectifier circuit for developing a square wave signal from AC power and a phase shift circuit operatively connected to said rectifier circuit for phase shifting the square wave signal an amount corresponding to the first duration.

19. The control circuit of claim 18 wherein said synchronization circuit further comprises a noise rejection circuit disposed between said rectifier circuit and said phase shift circuit, said noise rejection circuit comprising a comparator for limiting magnitude of the square wave signal and an RC filter circuit for filtering the limited square wave signal.

* * * * *